Jan. 6, 1925.

F. W. HALDER

HOT AND COLD WATER MIXER

Filed April 15, 1924

1,522,120

INVENTOR
FRED W. HALDER
BY
ATTORNEY

Patented Jan. 6, 1925.

1,522,120

UNITED STATES PATENT OFFICE.

FRED W. HALDER, OF PORTLAND, OREGON.

HOT AND COLD WATER MIXER.

Application filed April 15, 1924. Serial No. 706,762.

*To all whom it may concern:*

Be it known that I, FRED W. HALDER, a citizen of the United States of America, and a resident of the city of Portland, in the county of Multnomah and State of Oregon, have invented a new and useful Improvement in Hot and Cold Water Mixers, of which the following is a specification, such as will enable others skilled in the art to which it pertains to make the same, reference being had to the accompanying drawings, which form a part of this specification.

My invention relates to hot and cold water mixers for bath, shampoo, and other lavatory fixtures, and provides a device for effectively controlling and uniformly mixing the hot and cold water to any desired temperature.

One of the objects is to provide a mixing chamber into which both the hot and cold water will be injected with a whirling motion by means of and through two curved inlet ducts or pipes, and which will discharge therefrom hot, cold, or tempered water, by means of and through the shower or bath tub pipes.

Another object of this device is to provide a mixer of less parts and more simple in construction and operation, and capable of being attached at less expense than most other similar devices heretofore patented.

A further object of my invention is to provide a mixer of this character whereby the two curved inlet ducts or pipes with their free ends perforated discharge the water in opposite directions within the mixing chamber thereby resulting because of the location of the free ends of said inlet ducts in neither current having a component directly opposing or retarding its flow, which avoids the sudden jerking and consequent noise noted in many ordinary mixers where the currents impact upon each other directly from opposite directions. This is especially noticeable when the hot water is injected at a high temperature.

Further objects of the invention as well as the advantages thereof in actual use will be more fully comprehended from the specifications describing the same and as hereinafter claimed.

In the accompanying drawing,—

Figure 1:
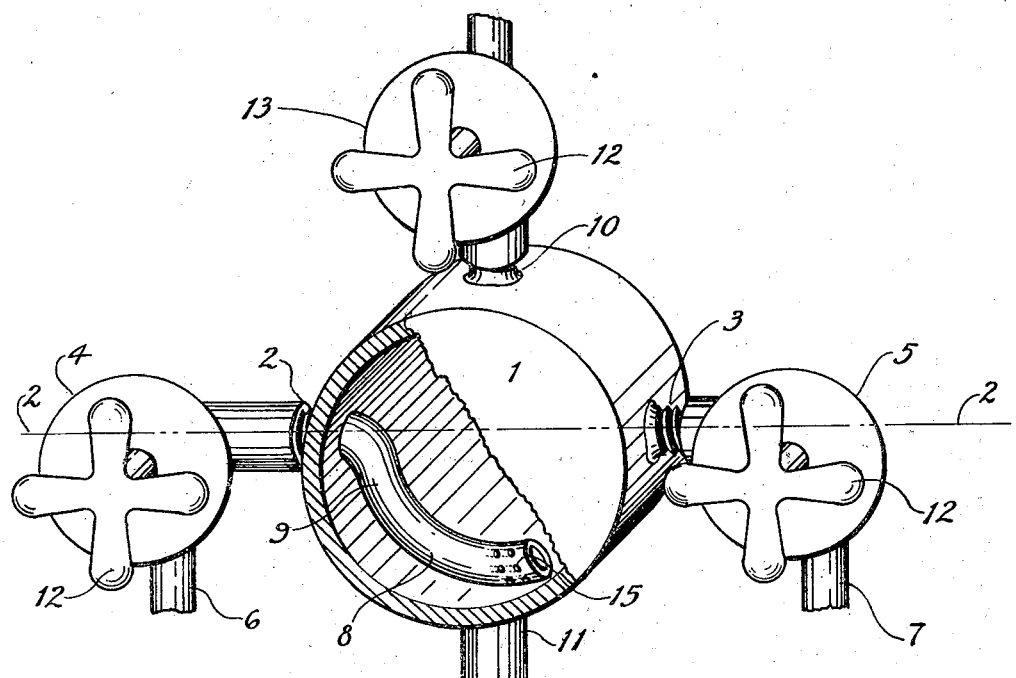
Figure 1 is a front elevation of the assembled device showing connections with the several pipes and valves, and with a part of the wall of the mixing chamber broken away.

In the drawings I have shown for the sake of simplicity the mixing chamber connected with a bath tub and shower fixture wherein like reference characters indicate like parts in all the figures. The device, however, may be connected with any known kind of bath or lavatory fixture to provide for shampoo, needle-spray, douche, and other baths.

In the device shown in Fig. 1, the hollow casting or mixing chamber 1 is preferably cylindrical in form, and is provided with threaded hot water inlet pipe 2, and a threaded cold water inlet pipe 3 attached thereto, to which in turn are attached hot water valve 4 and cold water valve 5, operated by respective hand-grips 12 to open and close these valves, thereby permitting or obstructing at will the flow of water. These valves and hand-grips may be of any known make or kind. Hot water supply pipe 6 and cold water supply pipe 7 connect with valves 4 and 5 respectively.

Figure 2:
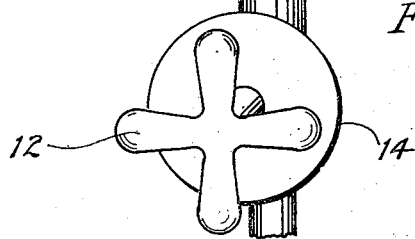
Fig. 2 is a horizontal section of the mixing chamber on line 2—2 of Fig. 1, especially illustrating the two curved ducts or inlet pipes.

The interior of mixing chamber or casting 1, Figs. 1 and 2, is provided with two discharge ducts or pipes 8 shown integral with the casting. Near the free ends of ducts 8 are provided holes or perforations shown at 15, inclined toward the main outlet thereof. Said ducts 8 may be constructed without such perforations, but in either case the ends forming the outlet thereof must be beyond the openings in pipes 10 and 11 hereinafter further described. Ducts or pipes 8 are placed diametrically opposite each other and form a continuation of water inlet pipes 2 and 3 respectively, and are purposely made to follow the inner periphery of the casting 1, diverging, however, from the central plane as indicated at 9 on each pipe 8 for a purpose hereinafter more fully explained.

Casing 1 is also provided with two threaded outlet pipes, the upper outlet pipe 10 being the means for supplying water for an overhead shower, and the lower outlet pipe 11 is the means for supplying water to the bath tub. Attached to outlet pipes 10 and 11 are control valves 13 and 14 respectively, with hand-grips 12 similar to those on control supply valves 4 and 5 for the purpose of turning on or shutting off the water issuing from the mixing chamber 1 after being evenly mixed therein.

Referring now to Fig. 2, it is seen that the ducts 8 pass on opposite sides of the axis of pipes 10 and 11 respectively, and extend a short distance beyond the outlet openings in said pipes 10 and 11, which results in giving a whirling motion to the water as it comes from either or both of pipes 2 and 3, insuring an even mixing before it can pass into either of the outlet passages through pipes 10 and 11. Attention is now invited to the fact that the two curved ducts 8 discharge in opposite directions within mixing chamber 1 thereby producing a result in which neither current has a component directly opposing or retarding its flow, which effectively avoids the sudden jerking and consequent explosive pounding noise so frequently noted in many ordinary mixers, which occurs when the currents impact upon each other directly from opposite directions, especially when the hot water is injected at a high temperature. In that type also when one branch is discharging a larger quantity of water or at a greater velocity than the other, its momentum or dynamic head is the greater and the sudden stopping of this velocity or a component of the velocity causes a change of dynamic or velocity head into a static head which creates in turn a back pressure upon the one of lesser flow, which is a function of its velocity, so it can readily be seen that the lesser flow is controlled by these factors, that is, it is not a direct function of the opening of its valve, hence the flow of the lesser will not be uniform for a uniform opening of the valve, but will be either accelerated or retarded by the quantity flowing from the larger intake pipe. These conditions are effectively eliminated by having the two curved ducts 8 discharge in opposite directions within the chamber at a point past either of the outlet passages through pipes 10 and 11. This much to be desired result is also assisted by providing holes or perforations shown at 15 near ends of each free end of ducts 8, which holes are inclined toward the outlet thereof. The result is a decided advantage over the ordinary hot and cold water mixing chamber which impact directly, and also an improvement over the more intricate and expensive forms of mixing chambers designed to accomplish a somewhat similar purpose.

The circular motion imparted to the water by the discharge from the curved ducts 8 against the walls of mixing chamber 1 effects a complete and even mixing or tempering of the water so that the outflow from either outlet 10 or 11 is always evenly mixed throughout and prevents the separate or straight currents of hot and cold water sometimes found in ordinary mixers, although permitting when desired the delivery of either hot or cold water.

The ends of ducts 8 may be of the round shape shown on the drawing or flat, and with or without the inclined holes hereinbefore described.

The operation of this device is readily understood and the amount of water entering the mixing chamber is controlled by the turning of hand-grips 12 leading to the inlet valves 4 and 5, and the evenly mixed water is distributed by the manually opening of the valves in either of discharge valves 13 or 14, by means of similar hand-grips 12.

It is obvious that various immaterial modifications may be made in the structural shape and size of the several parts of this device without departing from the spirit of my invention, hence I do not wish to be understood as limiting myself to the exact form or combination of parts herein illustrated or described nor to the uses mentioned.

I am aware that prior to my invention hot and cold water mixing devices have been made containing somewhat similar general features and structural parts of my device, but not of this type with as few, simple parts, nor apparently with the utilization of the principle of discharging the water in opposite directions past or beyond the outlet openings through bent inlet ducts, or with perforations inclined toward the free ends of said ducts, as described, therefore, I do not claim such a device broadly, but having described my invention, what I claim is:—

1. A hot and cold water mixing device consisting of a casting provided with a chamber therein, two curved inlet ducts within the chamber each capable of discharging water in opposite directions therein, said ducts passing on the opposite sides of the axis of two outlet pipes a short distance beyond said outlet pipes, thereby having no direct component opposing the flow of water therefrom, two outlet pipes for discharging the mixed water, and means for attaching said members together, substantially as and for the purpose described.

2. A hot and cold water mixing device consisting of a cylindrical casting provided with a chamber therein, a multiple of curved inlet ducts integral with the casting but diverging from the central plane, within said chamber, each duct being provided near the free end thereof with perforations inclined toward the outlet thereof capable of discharging water in opposite directions therein and the free ends of said ducts passing on the opposite sides of the axis of a multiple of outlet openings a short distance beyond said outlet openings, whereby the water discharged from said ducts will have no direct component opposing the flow therefrom, a multiple of outlet pipes for discharging the water, and means for attaching said members together, substantially as and for the purpose described.

3. In combination, a hot and cold water mixing device, consisting of a cylindrical casting provided with a mixing chamber therein, a multiple of curved inlet ducts integral with said casting and within said chamber, each duct being provided near the free end thereof with perforations inclined toward the outlet thereof capable of discharging either or both the hot and cold water in opposite directions therein, the free ends of said ducts passing on the opposite sides of the axis of a multiple of outlet openings and short distance beyond said outlet openings whereby the water discharged from said ducts will have no direct component opposing the flow, a multiple of threaded inlet pipes attached to said casting, a multiple of valves attached to said inlet pipes, a multiple of hand-grips attached to and inserted in said valves for controlling the entrance of water into said mixing chamber, a multiple of threaded outlet pipes entering said mixing chamber a short distance away from said perforated inlet ducts, a multiple of outlet valves attached to said outlet pipes, a multiple of hand-grips attached to and inserted in said valves for controlling the discharge of the mixed water from said mixing chamber, and means for attaching all said members together, substantially as and for the purpose described.

In testimony whereof, I have hereunto signed my name in the presence of two witnesses.

FRED W. HALDER.

Witnesses:
M. F. EDWARDS,
EMMA THOMSON.